US012451209B2

(12) United States Patent
Ratnam et al.

(10) Patent No.: US 12,451,209 B2
(45) Date of Patent: Oct. 21, 2025

(54) ERROR HANDLING

(71) Applicant: Micron Technology, Inc., Boise, ID (US)

(72) Inventors: Sampath K. Ratnam, San Jose, CA (US); Sean Brasfield, Boise, ID (US); Gary F. Besinga, Boise, ID (US); Michael G. Miller, Boise, ID (US); Renato C. Padilla, Folsom, CA (US); Tawalin Opastrakoon, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 157 days.

(21) Appl. No.: 17/965,909

(22) Filed: Oct. 14, 2022

(65) Prior Publication Data

US 2023/0393922 A1    Dec. 7, 2023

Related U.S. Application Data

(60) Provisional application No. 63/348,428, filed on Jun. 2, 2022.

(51) Int. Cl.
G11C 29/52     (2006.01)
G06F 11/07     (2006.01)
G11C 7/04      (2006.01)
G11C 16/26     (2006.01)
G11C 16/34     (2006.01)

(52) U.S. Cl.
CPC .......... *G11C 29/52* (2013.01); *G06F 11/0727* (2013.01); *G06F 11/0772* (2013.01); *G11C 7/04* (2013.01); *G11C 16/26* (2013.01); *G11C 16/34* (2013.01)

(58) Field of Classification Search
CPC .......... G11C 29/52; G11C 29/44; G11C 7/04; G11C 16/26; G11C 16/34; G06F 11/073; G06F 11/0727; G06F 11/0772; G06F 11/0793
See application file for complete search history.

(56) References Cited

U.S. PATENT DOCUMENTS

| 10,152,249 | B2 | 12/2018 | Trantham |
| 10,713,109 | B2 | 7/2020 | Tarlano et al. |
| 10,795,755 | B2 | 10/2020 | Nale et al. |
| 2019/0103164 | A1* | 4/2019 | Malshe ................ G11C 29/021 |
| 2019/0278653 | A1* | 9/2019 | Padilla, Jr. .......... G06F 11/0793 |
| 2019/0303283 | A1* | 10/2019 | McGlaughlin ........ G06F 3/0616 |
| 2021/0132823 | A1* | 5/2021 | Luo ..................... G06F 11/1048 |

\* cited by examiner

*Primary Examiner* — Mark D Featherstone
*Assistant Examiner* — Rong Tang
(74) *Attorney, Agent, or Firm* — Brooks, Cameron & Huebsch, PLLC

(57) ABSTRACT

Respective error handling (EH) flags can be set based at least in part on media management data of a memory device. Whether any of the EH flags are set can be determined. In response to determining that at least one of the EH flags is set, a subset of a plurality of operations of an EH flow associated with the set EH flags can be performed.

22 Claims, 8 Drawing Sheets

* EXAMPLE OF ERROR HANDLING FLOW IS LISTED BELOW

| STEP | ERROR RECOVERY NAME | ERROR MECHANISM | ENERGY/LATENCY |
|---|---|---|---|
| 1 | READ WITH NO READ LEVEL ADJUSTMENT | TRANSIENT VT (TVT) | LOW |
| 2 | READ WITH READ OFFSET OFFSET ADJUSTMENT 1 | DATA RETENTION (DR) | LOW |
| 3 | READ WITH READ OFFSET OFFSET ADJUSTMENT 2 | DATA RETENTION, CROSS-TEMPERATURE (xtemp) | LOW |
| 4 | READ WITH READ OFFSET OFFSET ADJUSTMENT 3 | DATA RETENTION, CROSS-TEMPERATURE | LOW |
| 5 | READ WITH NAND/CONTROLLER FEATURE 1 ENABLED | DATA RETENTION | MEDIUM/HIGH |
| 6 | READ WITH NAND/CONTROLLER FEATURE 2 ENABLED | DATA RETENTION | HIGH |
| 7 | READ WITH NAND/CONTROLLER FEATURE 3 ENABLED | DATA RETENTION, READ DISTURB (RD) | HIGH |
| 8 | READ WITH NAND/CONTROLLER FEATURE 4 ENABLED | DATA RETENTION, READ DISTURB | HIGH |
| 9 | RAIN | PHYSICAL DEFECT, PROGRAM STATUS FAIL (PSF) | HIGH |

FIG. 2

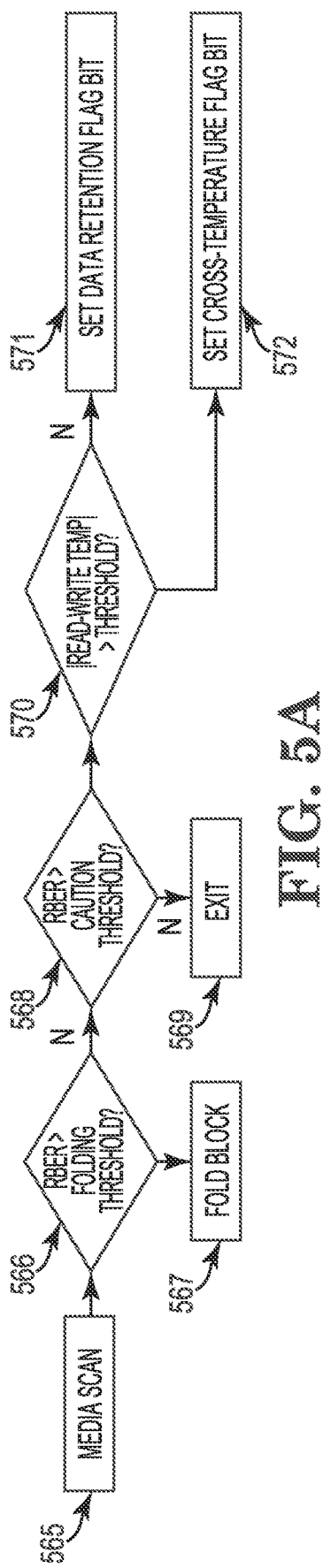
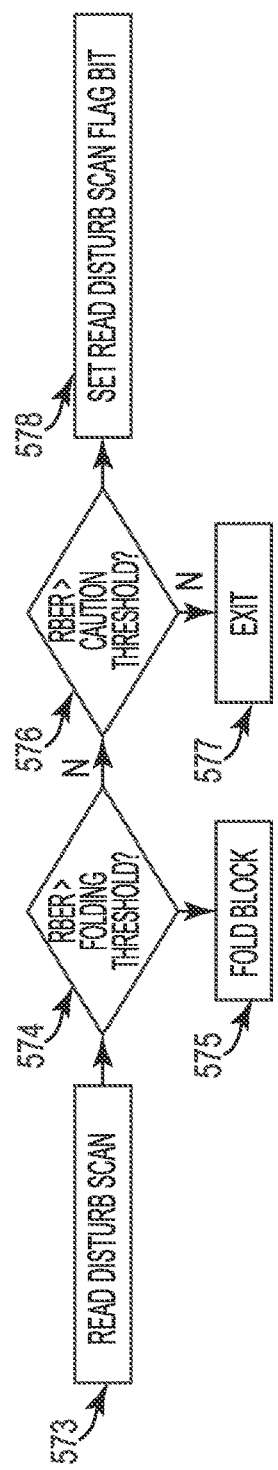
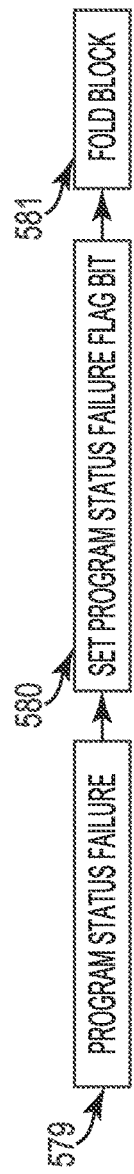
FIG. 5A
FIG. 5B
FIG. 5C

| STEP | ERROR RECOVERY NAME | ERROR MECHANISM | ERROR FLAG BITS (EH_FLAG[7:0]) | | | | | | | |
|---|---|---|---|---|---|---|---|---|---|---|
| | | | 7 | 6 | PS | RD | xtemp2 | xtemp1 | DR | TVT |
| 1 | READ WITH NO READ LEVEL ADJUSTMENT | TRANSIENT VT (TVT) | | | | | | | | 1 |
| 2 | READ WITH READ OFFSET OFFSET ADJUSTMENT 1 | DATA RETENTION (DR) | | | | | | | 1 | |
| 3 | READ WITH READ OFFSET OFFSET ADJUSTMENT 2 | DATA RETENTION, CROSS-TEMPERATURE (XTEMP) | | | | | | 1 | 1 | |
| 4 | READ WITH READ OFFSET OFFSET ADJUSTMENT 3 | DATA RETENTION, CROSS-TEMPERATURE | | | | | 1 | | 1 | |
| 5 | READ WITH NAND/CONTROLLER FEATURE 1 ENABLED | DATA RETENTION | | | | | | | 1 | |
| 6 | READ WITH NAND/CONTROLLER FEATURE 2 ENABLED | DATA RETENTION | | | | | | | 1 | |
| 7 | READ WITH NAND/CONTROLLER FEATURE 3 ENABLED | DATA RETENTION, READ DISTURB (RD) | | | | 1 | | | 1 | |
| 8 | READ WITH NAND/CONTROLLER FEATURE 4 ENABLED | DATA RETENTION, READ DISTURB | | | | 1 | | | 1 | |
| 9 | RAIN | PHYSICAL DEFECT, PROGRAM STATUS FAIL (PSF) | | | 1 | 1 | | | | |

FIG. 6

ERROR HANDLING

PRIORITY INFORMATION

This application claims the benefit of U.S. Provisional Application Ser. No. 63/348,428 filed on Jun. 2, 2022, the contents of which are incorporated herein by reference.

TECHNICAL FIELD

Embodiments of the disclosure relate generally to integrated circuits, and more specifically, relate to error handling.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is a table representative of an example EH flow in accordance with some embodiments of the present disclosure.

FIGS. 5A-5C are block diagrams representative of setting EH flags associated with an EH flow based on memory management data in accordance with some embodiments of the present disclosure.

FIG. 6 is a table representative of an example EH flow and associated EH flags in accordance with some embodiments of the present disclosure.

DETAILED DESCRIPTION

Figure 1:
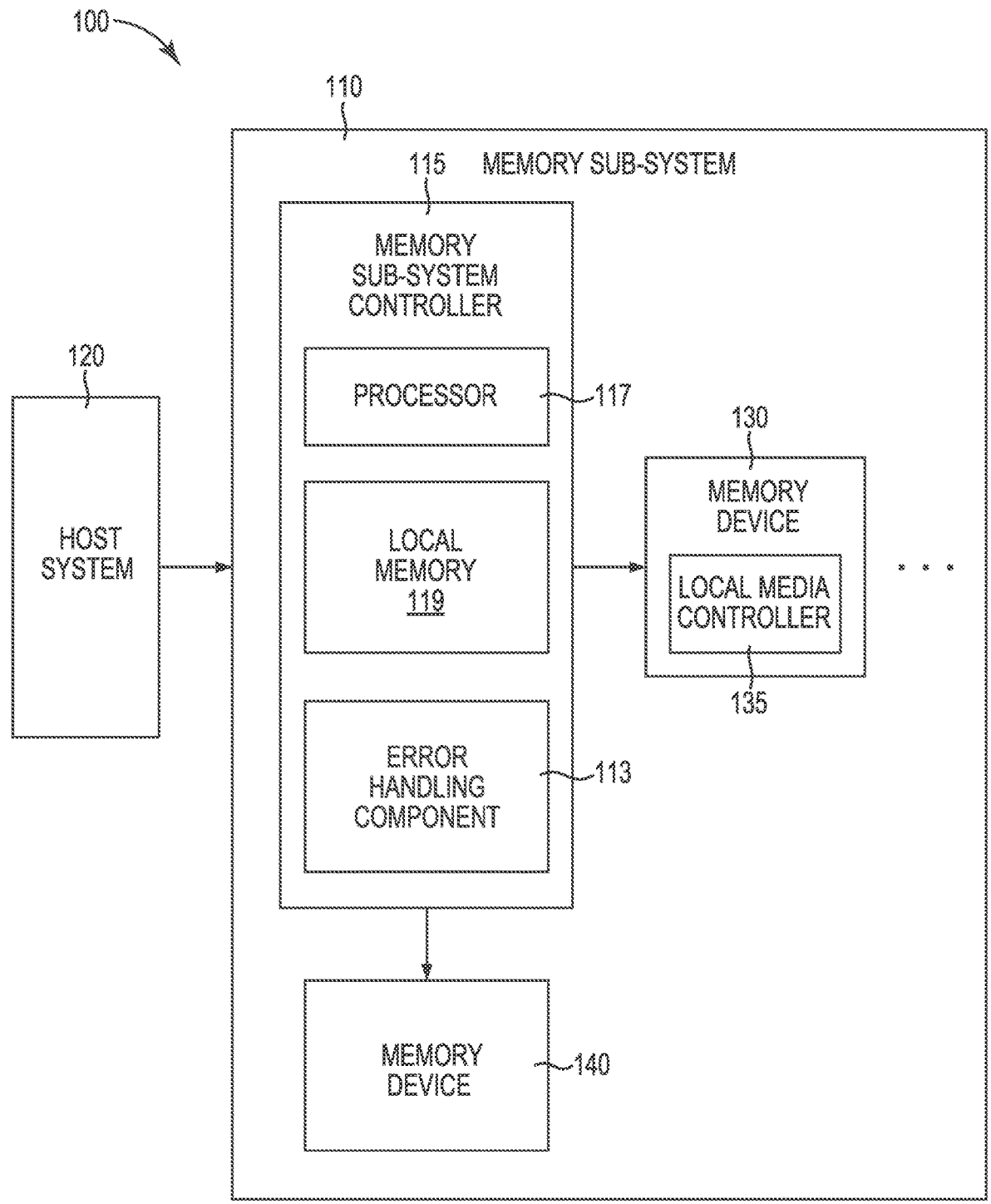
FIG. 1 is a block diagram of an example computing system that includes a memory sub-system in accordance with some embodiments of the present disclosure.

Aspects of the present disclosure are directed to error handling in a memory sub-system including a subset of operations of an error handling (EH) flow. EH flows can include operations to resolve errors caused by multiple error mechanisms. As used herein, the term "EH flow" generally refers to a series of operations to recover read data that includes one or more errors. Generally, each operation of an EH flow employs increasingly complex techniques to attempt to recover the data. As the complexity of the operations increases, so do the latency and/or the resources to complete the operations. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1," or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines. While both floating-gate architectures and replacement-gate architectures employ the use of select gates (e.g., select gate transistors), replacement-gate architectures can include multiple select gates coupled to a string of NAND memory cells. Further, replacement-gate architectures can include programmable select gates.

The pages of memory cells of, for example, a NAND memory device can be arranged in a row and have a bit line structure that connects into a memory "address" called a word line. The address provides a means of identifying a location for data storage, and the word line forms an electrical path allowing all the memory cells on that row to be activated at the same time for storage ("write") or retrieval ("read"). A set of memory cells (e.g., a page of memory cells or multiple pages of memory cells) that are coupled to a particular word line or to a set of particular word lines can be referred to herein as a "word line group" or a "page of memory cells of a word line group." In the alternative, a word line group can be described as comprising or including one or more pages or sets of memory cells.

Due to the characteristics of memory cells, and, more specifically, the inherent characteristics of non-volatile memory cells (e.g., NAND memory cells), a quality of such memory cells generally degrade over time. This degradation in quality can be based on a quantity of program-erase cycles (PECs) experienced by the memory cells, a frequency that data is written to or read from the memory cells, an amount of time that data written to the memory cells is stored by the memory cells, workloads experienced by the memory cells, operational temperatures of the memory cells, and/or process variations within the memory cells (or sets of the memory cells), among other factors that can contribute to degradation of such memory cells. This degradation of quality of the memory cells can give rise to errors involving data written to the memory cells, which can be costly to correct in terms of time, power consumption, cross-temperature behavior, and/or quality of service (QoS).

Some previous approaches attempt to mitigate the adverse effects of such degradation may include executing EH flows. Execution of EH flows include performance of operations directed to mitigate effects of errors caused by multiple types of error mechanisms. Each stage of an EH flow operation employs increasingly complex techniques to attempt to resolve one or more errors. An EH flow may be referred to herein in the alternative as a "error recovery flow." In some approaches, EH flows may be hard-coded in firmware of a memory device. As such, previous approaches do not provide the capability to bypass operations of an EH flow that are not directed to mitigation of error mechanisms that have not occurred. Such fixed and pre-determined EH flows may negatively impact performance of a memory device and/or increase latency due to performance of unnecessary operations.

Aspects of the present disclosure address the above and other deficiencies inherent in previous approaches by utilizing data generated by memory management operations performed by a memory device (also referred to as memory management data) to identify an error mechanism. Traditionally, memory management data is neither used nor collected. However, memory management data of a memory device can be indicative of specific error mechanisms occurring on or within the memory device. By identifying particular error mechanisms occurring on or within a memory device, as described herein, control circuitry of the memory device can perform only those operations of an EH flow that mitigate errors caused by the identified error mechanisms. In other words, embodiments herein allow for operations of an EH flow directed to mitigation of errors caused by error mechanisms not indicated by memory management data to be bypassed. Accordingly, some embodiments can reduce latency and/or resource consumption (e.g., power consumption) associated with error handling by performing fewer than all operations of an EH flow unless necessary.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an error handling component 113. Although not shown in FIG. 1 so as to not obfuscate the drawings, the error handling component 113 can include various circuitry to facilitate identification of error mechanisms based on memory management data of the memory device 130 and performance operations of an EH flow directed to the identified error mechanisms. As used herein, memory management data generally refers to information collected during performance of memory management operations, which can be performed routinely. Non-limiting examples of memory management data can include bit error rate (BER), raw bit error rate (RBER), program status flags, and cross-temperature data. Non-limiting examples of memory management operations include workload dependent scans of a memory device. As used herein, workload dependent scans can refer to scans configured to detect issues caused by one or more specific workloads. A non-limiting example of a workload dependent scan is a read disturb scan in which the amount of reads is tracked for a physical block or a die. If the amount of reads exceeds a threshold, then the read disturb scan is triggered to determine a RBER, then perform a folding operation as needed. A folding operation refers to a process by which valid data is read from a set of memory cells of a memory device and rewritten to a different set of memory cells of the memory device for purposes of storing valid data together and freeing up memory space for new writes, to avoid errors in the data, and/or as part of an error handling operation. Another non-limiting example of a workload dependent scan is a media scan in which a scan is triggered, at a fixed interval (e.g., a fixed amount of reads) for a physical block or a die to determine a RBER and perform a folding operation as needed.

As described in more detail, herein, memory management operations can be performed as part of normal (e.g., standard or routine) functions of the memory sub-system 110 and can therefore generate data that can be indicative of one or more error mechanisms occurring on the memory device 130. The error handling component 113 can retrieve memory management data (from the local memory 119, for example). The error handling component 113 can determine whether the retrieved memory management data is indicative of one or more error mechanisms. The error handling component 113 can set EH flags corresponding to respective operations of an EH flow that are directed to the error mechanisms indicated by the memory management data. In some embodiments, the error handling component 113 can perform only the operations of the EH flow having its corresponding EH flag set. By performing only a subset of operations of an EH flow, latency caused by error handling is reduced. In some embodiments, the error handling component 113 can include special purpose circuitry in the form of an ASIC, FPGA, state machine, and/or other logic circuitry that can allow the error handling component 113 to orchestrate and/or perform error operations described herein involving the memory device 130 and/or the memory device 140. In some embodiments, the processor 117 can perform one or more of operations described herein in association with the error handling component 113.

In some embodiments, the memory sub-system controller 115 includes at least a portion of the error handling component 113. For example, the memory sub-system controller 115 can include a processor 117 (processing device) configured to execute instructions stored in local memory 119 for performing the operations described herein. In some embodiments, the error handling component 113 is part of the host system 120, an application, or an operating system.

In some embodiments, the memory sub-system 110, and hence the error handling component 113, the processor 117, and the memory devices 130/140, can be resident on a mobile computing device such as a smartphone, laptop, or phablet among other similar computing devices. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device or any other type of edge computing device(s).

Further, the error handling component 113 can be resident on the memory sub-system 110. As used herein, the term "resident on" refers to something that is physically located on a particular component. For example, the error handling component 113 being "resident on" the memory sub-system 110 refers to a condition in which the hardware circuitry that comprises the error handling component 113 is physically located on the memory sub-system 110. The term "resident on" can be used interchangeably with other terms such as "deployed on" or "located on," herein.

FIG. 2 is a table representative of an example EH flow 250 in accordance with some embodiments of the present disclosure. The EH flow 250 is for illustrative purposes only. Embodiments of the present disclosure can include EH flows including many more steps or operations, and/or different operations than those of the EH flow 250. The steps of the EH flow 250 are in a sequence such that operations that consume low amounts of energy and/or cause low amounts of latency are performed before operations that consume high amounts of energy and/or cause high amounts of latency are performed. Each of the operations of the EH flow 250 can be performed on a page, block, etc. of a memory device (such as the memory device 130 described in association with FIG. 1).

In some previous approaches, each and every step of the EH flow 250 is performed regardless of an error mechanism that necessitated execution of the EH flow 250. As used herein, error mechanism generally refers to a mechanism that causes errors to be introduced to data when the data is read (e.g., read errors, which may include increased RBER, and/or other errors that cause corruption in data written to a memory device). For instance, if a transient threshold voltage ($V_t$) results in an error, then the transient $V_t$ is the error mechanism associated with the error. If a change in a $V_t$ distribution corresponding to data retention, read disturb, and/or cross-temperature (referred to as data retention, read disturb, and cross-temperature, respectively, in FIG. 2 for simplicity) results in an error, then the change in the $V_t$ distribution from the data retention, read disturb, and/or cross-temperature the error mechanism associated with the error.

An EH flow, such as the EH flow 250, can be configured to resolve and/or mitigate effects of one or more errors associated with different error mechanisms 251. As illustrated by FIG. 2, each step of the EH flow 250 is intended to address one or more error mechanisms 251. Step 1 of the EH flow 250 is directed to resolving and/or mitigating effects of an error caused by a transient $V_t$ of a memory device by performing a read operation without adjusting a read level (e.g., read voltage) that is used to perform the read. As used herein, "transient $V_t$," refers to a change in a $V_t$ or a changing $V_t$ relative to an expected or normal $V_t$.

Steps 2-8 are directed to resolving and/or mitigating effects of an error related to data retention of a memory device. Steps 2-4 include performing read operations with increasing adjustments to the read level. For instance, a read level can be incremented each time a read operation is retried in Steps 2-4. Steps 5-8 include performing read operations with one or more NAND and/or controller features enabled. Non-limiting examples of such features include performing a read operation with no VT adjustment, which can be similar to that of Step 1, and performing a read operation with a different offsets from a read level, which can be similar to those of any one of Steps 2-4.

Steps 3 and 4 are also directed to resolving and/or mitigating effects of an error caused by cross-temperature. As used herein, "cross-temperature" refers to a condition in which data is written to one or more memory cells when the memory cells are at one temperature but read from the memory cells when the memory cells are at a different temperature. Temperature variation can cause corresponding changes in $V_t$ distributions, which may negatively affect data retention and/or reading from the memory cells.

Steps 7 and 8 are also directed to resolving and/or mitigating effects of an error caused by read disturb. Step 9 is directed to resolving and/or mitigating effects of an error caused by physical defect and/or program status failure (PSF) by performing a redundant array of independent NAND (RAIN) recovery operation.

Because an EH flow, such as the EH flow 250, is often hard-coded in firmware of a memory device, some previous approaches have not provided customization of the EH flow, or operations thereof, to resolve and/or mitigate effects of an error caused by a specific error mechanism. In some previous approaches, the specific error mechanism that causes an error may be unknown. Thus, because some previous approaches are unaware of the specific error mechanism that causes an error, an EH flow must be executed blindly from start to finish, or until the error is resolved.

Figure 3:
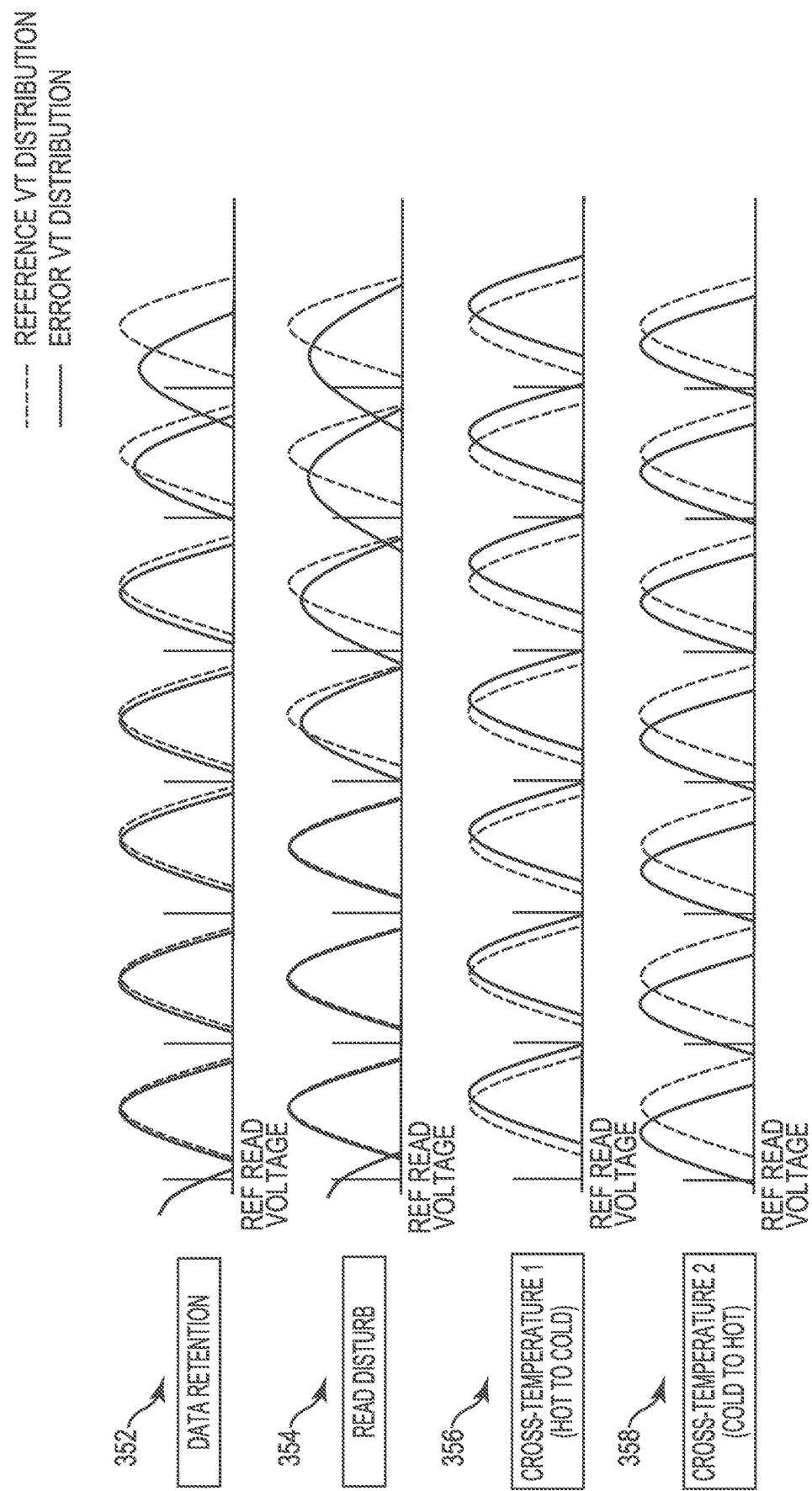
FIG. 3 is a diagram illustrating respective changes in threshold voltage ($V_t$) distributions associated with different error mechanisms.

FIG. 3 is a diagram illustrating respective $V_t$ distributions associated with different error mechanisms. FIG. 3 illustrates reference read voltages (illustrated by vertical lines) corresponding to respective data states of a memory cell (e.g., a TLC memory cell)). Reference $V_t$ distributions are illustrated by dashed lines. $V_t$ distributions affected by an error mechanism (also referred to as error $V_t$ distributions) are illustrated by solid lines.

At 352, FIG. 3 illustrates an effect of a data retention error mechanism on $V_t$ distributions. A data retention error mechanism can cause $V_t$ distributions to widen relative to reference $V_t$ distributions as demonstrated by the error $V_t$ distributions. Widening of $V_t$ distributions can cause a corresponding decrease in read margin associated with one or more data states of a memory cell. As used herein, "read margin" refers to a distance (e.g., a voltage difference) between adjacent threshold voltage ($V_t$) distributions at a particular BER or RBER. A data retention error mechanism can cause $V_t$ distributions to shift to lower voltages relative to reference $V_t$ distributions as demonstrated by the error $V_t$ distributions. A decrease in read margin and/or a shift of $V_t$ distributions can cause the error $V_t$ distributions for some data states to overlap as illustrated by FIG. 3. Such overlaps of the error $V_t$ distributions can cause errors because a read voltage that is supposed to be indicative of a particular data state may erroneously be indicative of another data state (e.g., a lower data state).

At 354, FIG. 3 illustrates an effect of a read disturb error mechanism on $V_t$ distributions. A read disturb error mechanism can cause $V_t$ distributions to widen relative to reference $V_t$ distributions as demonstrated by the error $V_t$ distributions. Widening of $V_t$ distributions can cause a corresponding decrease in a read margin associated with one or more data states of a memory cell. A decrease in a read margin can cause the error $V_t$ distributions for some data states to overlap as illustrated by FIG. 3. Although the effect of a data retention error mechanism can be similar to the effect of a read disturb error mechanism (comparing 352 to 354), the effect of a read disturb error mechanism causes only one tail (e.g., the lower tail) to shift towards lower voltages relative to reference $V_t$ distributions. The effect on the $V_t$ distributions (at 354) is more pronounced and occurs for more data states than the effect of a data retention error mechanism (at 352). The overlaps of the error $V_t$ distributions can cause errors because a read voltage that is supposed to be indicative of a particular data state may erroneously be indicative of another data state (e.g., a lower data state).

At 356, FIG. 3 illustrates an effect of a hot to cold cross-temperature error mechanism on $V_t$ distributions. A hot to cold cross-temperature error mechanism can cause $V_t$ distributions to shift towards higher voltages. Shifts to higher voltages can cause an error $V_t$ distribution associated with a particular data state to encompass voltages associated with a different data state (e.g., a right tail of an error $V_t$ distribution exceeds a reference read voltage associated with a different data state). Thus, such shifts can cause errors because a read voltage that is supposed to be indicative of a particular data state may erroneously be indicative of another data state (e.g., a higher data state).

At 358, FIG. 3 illustrates an effect of a cold to hot cross-temperature error mechanism on $V_t$ distributions. A cold to hot cross-temperature error mechanism can cause $V_t$ distributions to shift towards lower voltages. Shifts to lower voltages can cause an error $V_t$ distribution associated with a particular data state to encompass voltages associated with a different data state (e.g., a left tail of an error $V_t$ distribution falls below a reference read voltage associated with a different data state). Thus, such shifts can cause errors because a read voltage that is supposed to be indicative of a particular data state may erroneously be indicative of another data state (e.g., a lower data state).

The error $V_t$ distributions corresponding to various error mechanisms, as illustrated by FIG. 3, demonstrate that respective error mechanisms can have different and distinct effects on $V_t$ distributions. Thus, a correction (e.g., a step of an EH flow) to resolve an error caused by an error mechanism may not resolve an error caused by a different error mechanism. For instance, a correction to cause error $V_t$ distributions corresponding to a data retention error mechanism (at 352) to return to reference $V_t$ distributions can require a different correction than that to cause error $V_t$ distributions corresponding to a hot to cold cross-temperature error mechanism (at 356) to return to reference $V_t$ distributions. Therefore, previous approaches to error handling that include performing a sequence of operations (corrections) irrespective of an error mechanism causing an error and/or whether some of the operations are not applicable and/or effective to resolving and/or mitigating errors caused by other error mechanisms.

Figure 4:
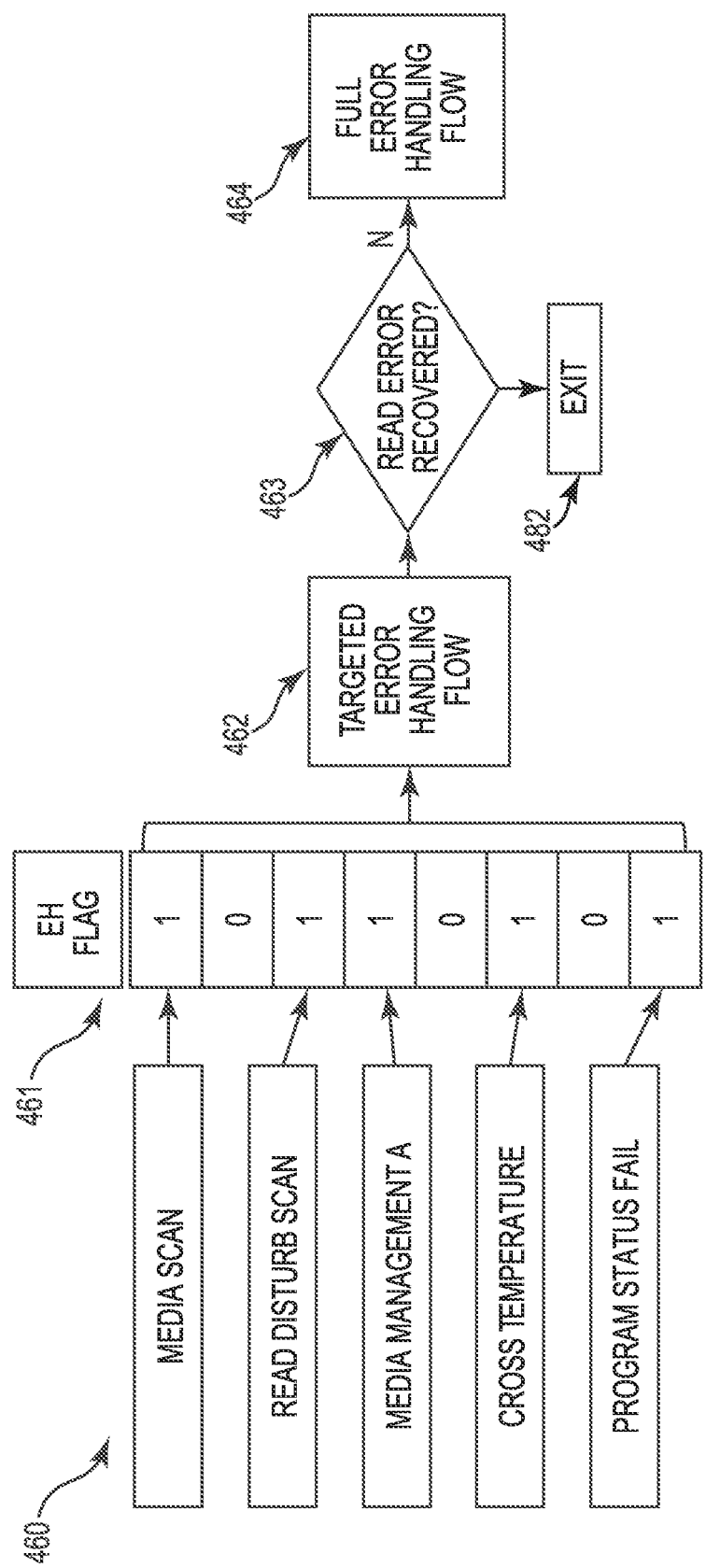
FIG. 4 is a block diagram representative of error handling in accordance with some embodiments of the present disclosure.

FIG. 4 is a block diagram representative of error handling in accordance with some embodiments of the present disclosure. Memory management data, which, in some previous approaches, may not have been collected and/or stored, can be indicative of error mechanisms. As described above, in contrast, in some embodiments, memory management data can be collected and stored. If the memory management data is indicative of one or more error mechanisms, then one or more EH flags associated with the indicated error mechanisms can be set. The EH flags can be respective bits where a "0" indicates an EH flag not being set and a "1" indicates an EH flag being set, or vice versa. In some embodiments, such bits can be stored in a memory of control circuitry, such as the memory sub-system controller 115 described in association with FIG. 1.

In addition to being corresponding to an error mechanism, each EH flag is associated with an operation of an EH flow that can resolve and/or mitigate effects of an error associated with the error mechanism. When an EH flow is initiated (in response to an error, for example), only those operations of the EH flow having a set EH flag are performed. FIG. 4 illustrates an example of error handling in accordance with some embodiments. However, embodiments of the present disclosure are not limited to the memory management data, error mechanisms, or EH flow, and operations thereof, described in association with FIG. 4.

FIG. 4 illustrates five (5) sources 460 of memory management data: media scan (e.g., periodic scan), read disturb scan, media management, cross-temperature (e.g., cold to hot, hot to cold), and program status failure. In the example of FIG. 4, the memory management data from the sources 460 is indicative of respective error mechanisms. Accordingly, the associated ones of EH flags 461 are set to "1". At 462, targeted error handling is performed by performing only those operations of an EH flow (such as the EH flow 250 described in association with FIG. 2) that have a set one of the EH flags 461 (e.g., an EH flag set to a value of "1"). At 463, if the targeted error handling (at 462) recovers (e.g., resolve and/or mitigate effects of) the error (e.g., read error), then no further operations of the EH flow are performed and, at 482, the process exits. However, if (at 463) the targeted error handling (at 462) does not recovers the error, then, at 464, the EH flow is performed in full.

In some embodiments, bits corresponding to the EH flags 461 can be stored in volatile memory (e.g., the memory device 140 described in association with FIG. 1) during operation of a memory sub-system. Bits corresponding to the EH flags 461 can be transferred to non-volatile memory (e.g., the memory device 130) upon powering down (e.g., entering a low power state or off) of a memory sub-system. Bits corresponding to the EH flags 461 can be transferred to volatile memory upon powering up (e.g., entering a high power state or on) of a memory sub-system.

FIGS. 5A-5C are block diagrams representative of setting EH flags associated with an EH flow based on memory management data in accordance with some embodiments of the present disclosure. Specifically, FIGS. 5A-5C illustrate setting EH flags associated with an EH flow based on memory management data from a media scan (FIG. 5A), a read disturb scan (FIG. 5B), and a program status failure (FIG. 5C). However, embodiments of the present disclosure are not limited to the examples illustrated by FIGS. 5A-5C.

A media scan (at 565) can yield memory management data, such as a raw bit error rate (RBER). At 566, a RBER from a media scan can be compared to a threshold RBER (e.g., a folding threshold). If the RBER exceeds (e.g., is greater than) the threshold RBER, then, at 567, one or more blocks of a memory device (e.g., the memory device 130 described in association with FIG. 1) can be folded. Folding can be used to move or rewrite valid data to a new location for the purpose of error handling, error avoidance, and/or garbage collection. The page of memory cells can be from a particular block of memory.

If, at 566, the RBER does not exceed (e.g., is less than or equal to) the threshold RBER, then, at 568, the RBER can be compared to another threshold RBER (e.g., a caution threshold). The threshold RBER at 568 can be less than the threshold RBER at 566. If, at 568, the RBER does not exceed (e.g., is less than or equal to) the other threshold RBER, then, at 569, the process exits without setting a EH flag associated with an error mechanism.

If, at 568, the RBER exceeds (e.g., is greater than) the other threshold RBER, then, at 570, a read-write temperature (e.g., an absolute value of a temperature differential between a temperature of a memory cell when written to and a temperature of the memory cell when read from) is compared to a threshold temperature (e.g., a threshold temperature differential). If the read-write temperature does not exceed (e.g., is less than or equal to) the threshold temperature, then, at 571, a EH flag (e.g., one of the EH flags 461 described in association with FIG. 4) associated with a data retention error mechanism is set. If, at 570, the read-write temperature exceeds (e.g., is greater than) the threshold temperature, then, at 572, a EH flag (e.g., one of the EH flags 461) associated with a cross-temperature error mechanism is set.

A read disturb scan (at 573) can yield memory management data, such as a raw bit error rate (RBER). At 574, a RBER from a read disturb scan can be compared to a threshold RBER (e.g., a folding threshold). If the RBER exceeds (e.g., is greater than) the threshold RBER, then, at 575, one or more blocks of a memory device (e.g., the memory device 130) can be folded. If, at 574, the RBER does not exceed (e.g., is less than or equal to) the threshold RBER, then, at 576, the RBER can be compared to another threshold RBER (e.g., a caution threshold). The threshold RBER at 576 can be less than the threshold RBER at 574. If, at 576, the RBER does not exceed (e.g., is less than or equal to) the other threshold RBER, then, at 577, the process exits without setting a EH flag associated with an error mechanism. If, at 576, the RBER exceeds (e.g., is greater than) the other threshold RBER, then, at 578, a EH flag (e.g., one of the EH flags 461) associated with a read disturb error mechanism is set.

In response to a program status failure, at 579, a EH flag (e.g., one of the EH flags 461) associated with a program status failure error mechanism is set, at 580. In some embodiments, at 581 one or more blocks of a memory device (e.g., the memory device 130) can be folded in addition to, or as a result of, setting the EH flag associated with a program status failure error mechanism.

FIG. 6 is a table representative of an example EH flow 650 and associated EH flags 661 in accordance with some embodiments of the present disclosure. The EH flow 650 and error mechanisms 651 can be analogous to the EH flow 250 and error mechanisms 251 described in association with FIG. 2. The EH flags 661 can be analogous to the EH flags 461 described in association with FIG. 4.

In some embodiments, the EH flags 661 can be an 8-bit string (eh_flag[7:0]). All bits of the string (eh_flag) can be "0" at initialization of a memory device (e.g., the memory device 130 described in association with FIG. 1). As illustrated in FIG. 6, all 8 bits may not be used (6, 7). However, embodiments are not so limited to 8-bit strings or not using all bits of a string. For illustrative purposes only, FIG. 6 illustrates the EH flags 661 including all the EH flags 661 being set (e.g., "1"). However, a subset of the EH flags 661 can be set depending on which of the error mechanisms 651 are indicated by memory management data.

Step 1 of the EH flow 650 is directed to resolving and/or mitigating effects of an error caused by a transient threshold voltage ($V_t$) (TVT). As such, the TVT flag (bit 0 of eh_flag) is set. Steps 2-8 of the EH flow 650 are directed to resolving and/or mitigating effects of an error related to data retention (DR). As such, the DR flag (bit 1 of eh_flag) is set. Step 3 of the EH flow 650 is directed to resolving and/or mitigating effects of an error caused by hot to cold cross-temperature (xtemp). As such, the xtemp1 flag (bit 2 of eh_flag) is set. Step 4 of the EH flow 650 is directed to resolving and/or mitigating effects of an error caused by cold to hot cross-temperature. As such, the xtemp2 flag (bit 3 of eh_flag) is set. Steps 7 and 8 of the EH flow 650 are also directed to resolving and/or mitigating effects of an error caused by read disturb (RD). As such, the RD flag (bit 4 of eh_flag) is set. Step 9 of the EH flow 650 is directed to resolving and/or mitigating effects of an error caused by physical defect and/or program status failure (PSF). As such, the PSF flag (bit 5 of eh_flag) is set.

One of the EH flags 661 (1 bit) can be associated one step or a group of steps of the EH flow 650 to recover from a targeted one of the error mechanisms 651. A step, or a group of steps, of the EH flow 650 can be enabled by setting the associated one or more of the EH flags 661 (e.g., changing bits of eh_flag[7:0] to "1"). If all the EH flags 661 are not set e.g., bits of eh_flag[7:0] are "0") the full (non-targeted) EH flow 650 can executed. If execution of an targeted EH flow 650 is unsuccessful for recovering from an error, then all the EH flags 661 can be unset (e.g., changing all bits of eh_flag[7:0] to "0") so that the full (non-targeted) EH flow 650 is executed subsequently.

Figure 7:
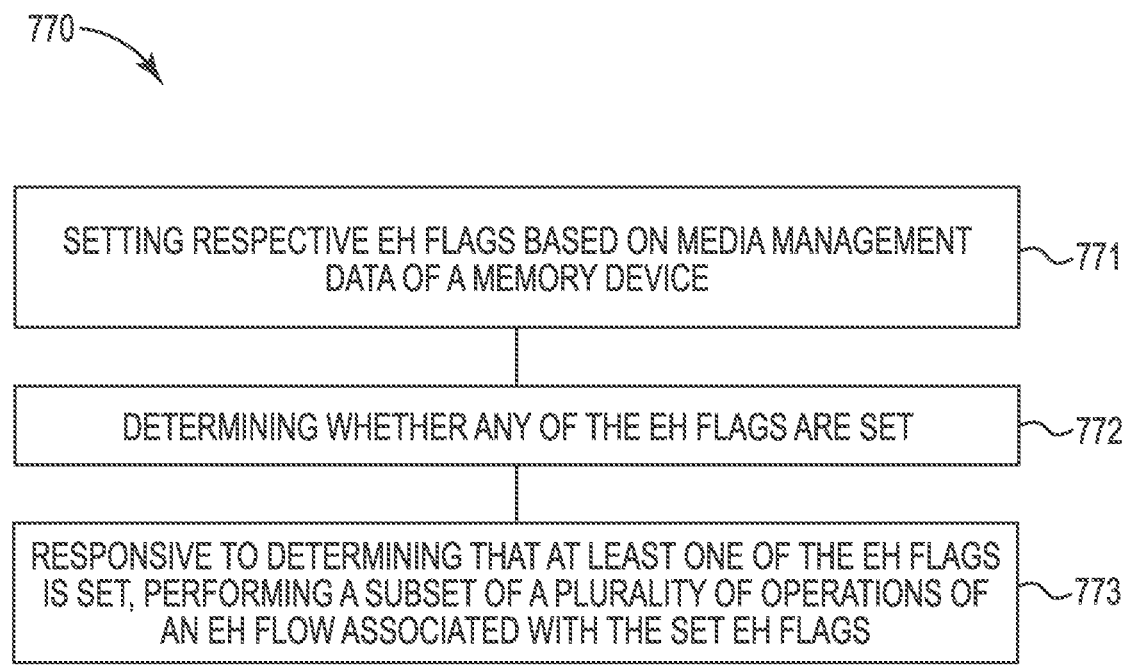
FIG. 7 is a flow diagram corresponding to a method for error handling in accordance with some embodiments of the present disclosure.

FIG. 7 is a flow diagram corresponding to a method 770 for error handling in accordance with some embodiments of the present disclosure. The method 770 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 770 is performed by one or more components of the memory sub-system 110 described in association with FIG. 1. Although shown in a particular sequence or order, unless otherwise specified, the order of the method 770 can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 771, the method 770 can include setting respective EH flags based on corresponding media management data of a memory device. At 772, the method 770 can include determining whether any of the EH flags are set. At 773, the method 770 can include, responsive to determining that at least one of the EH flags is set, performing a subset of a plurality of operations of an EH flow associated with the set EH flags. Although not specifically illustrated, the method 770 can include determining whether performing the subset of the plurality of operations of the EH flow resolved an error of the memory device. Responsive to determining that the error is not resolved, all the plurality of operations of the EH flow can be performed.

Although not specifically illustrated, the method 770 can include, responsive to determining that none of the EH flags are set, performing the plurality of operations of the EH flow. The method 770 can include determining that a block of data stored on the memory device has experienced an error. The media management data can be based on a physical portion of the memory device on which the block of data is stored. The media management data can be indicative of an error mechanism corresponding to the error.

Although not specifically illustrated, the method 770 can include obtaining at least a portion of the media management data via a periodic scan of the memory device. The method 770 can include obtaining at least a portion of the media management data via a workload dependent scan of the memory device. At least a portion of the media management data can be based on a program operation status of the memory device and/or a cross-temperature of the memory device (e.g., a difference of a first temperature of a memory cell of the memory device when data is written to the memory cell and a second temperature of the memory cell when the data read from the memory device).

Figure 8:
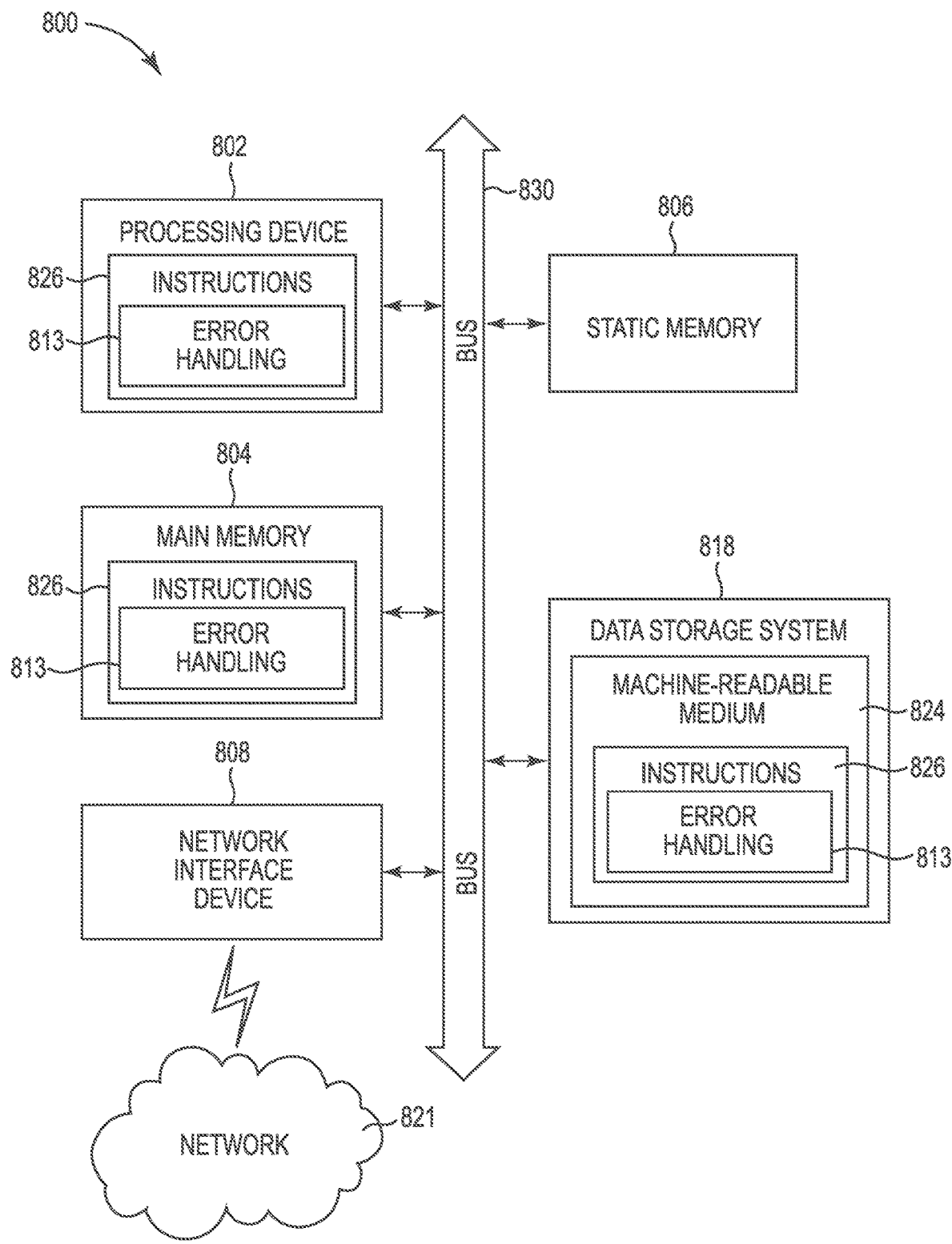
FIG. 8 is a block diagram of an example computer system 800 in which embodiments of the present disclosure may operate.

FIG. 8 is a block diagram of an example computer system 800 in which embodiments of the present disclosure may operate. For instance, the computer system 800 within which a set of instructions, for causing the machine to perform any one or more of the methodologies discussed herein, can be executed. In some embodiments, the computer system 500 can correspond to a host system (e.g., the host system 120 described in association with FIG. 1) that includes, is coupled to, and/or utilizes a memory sub-system (e.g., the memory sub-system 110) or can be used to perform the operations of a controller (e.g., to execute an operating system to perform operations corresponding to the error handling component 113). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

The processing device 802 represents one or more general-purpose processing devices, such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 821.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110.

In some embodiments, the instructions 826 include instructions to implement functionality corresponding to an error handling component (e.g., the error handling component 113). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In some embodiments, the instructions 826 can include instructions to store data generated by a plurality of memory management operations of a memory device. The data can be indicative of a number of error mechanisms experienced by the memory device. The instructions 826 can include instructions to set a number of EH flags corresponding to respective operations of an EH flow that are configured to resolve a number of errors associated with the number of error mechanisms. The EH flags can be set based on the data. The instructions 826 can include instructions to perform the respective operations of the EH flow based on the number of EH flags.

The instructions 826 can include instructions to, subsequent to performance of the respective operations of the EH flow, determine whether the number of errors are resolved. The instructions 826 can include instructions to, responsive to determining that the number of errors are not resolved, perform all operations of the EH flow.

The plurality of memory management operations can include a periodic scan of the memory device that yields a RBER of a block of data stored by the memory device and a cross-temperature of the block of data. The instructions 826 can include instructions to determine whether the RBER is greater than a first threshold value; responsive to determining that the RBER is greater than the first threshold value, fold the block of data; and responsive to determining that the RBER is not greater than the first threshold value, determine whether the RBER is greater than a second threshold value. The instructions 826 can include instructions to, responsive to determining that the RBER is greater than the second threshold value, determine whether the cross-temperature is greater than a third threshold value. The instructions 826 can include instructions to, responsive to determining that the cross-temperature is greater than the third threshold value, set a first one of the number of EH flags associated with a data retention operation of the EH flow; and responsive to determining that the cross-temperature is not greater than the third threshold value, set a second one of the number of EH flags associated with a cross-temperature operation of the EH flow.

The plurality of memory management operations can include a workload dependent scan of the memory device that yields a RBER of a block of data stored by the memory device. The instructions 826 can include instructions to determine whether the RBER is greater than a first threshold value; responsive to determining that the RBER is greater than the first threshold value, fold a block of data stored by the memory device; and responsive to determining that the RBER is not greater than the first threshold value, determine whether the RBER is greater than a second threshold value. The instructions 826 can include instructions to, responsive to determining that the RBER is not greater than the second threshold value, set a particular one of the number of EH flags associated with a read disturb operation of the EH flow.

The plurality of memory management operations can include a program operation status of the memory device. The instructions 826 can include instructions to set a particular one of the number of flags associated with a program failure operation of the EH flow and fold the block of data.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
setting respective error handling (EH) flags based on media management data, wherein the media management data is associated with multiple error mechanisms of a memory device, and wherein the media management data includes data obtained via a read disturb scan that involves tracking an amount of reads for a block of memory cells;
determining a status of the EH flags; and
responsive to determining that at least one of the EH flags is set, performing a subset of a plurality of operations of a default EH flow,
wherein the subset of the plurality of operations of the default EH flow that are performed is based on which particular EH flags are set, and wherein each of the EH flags corresponds to a respective one of the plurality of operations of the default EH flow, and wherein the respective EH flags include:
a first EH flag having its status determined based on the read disturb scan; and
a second EH flag having its status determined based on a media scan separate from the read disturb scan.

2. The method of claim 1, further comprising, responsive to determining that none of the EH flags are set, performing the plurality of operations of the default EH flow.

3. The method of claim 1, wherein the respective EH flags include a third EH flag having its status determined based on the media scan separate from the read disturb scan, and wherein the media scan separate from the read disturb scan involves cross-temperature data.

4. The method of claim 3, wherein the respective EH flags include a fourth EH flag having its status determined based on whether the block of memory cells has experienced a program status failure.

5. The method of claim 1, further comprising performing the media scan separate from the read disturb scan periodically.

6. The method of claim 1, further comprising obtaining at least a portion of the media management data via a workload dependent scan of the memory device.

7. The method of claim 1, wherein at least a portion of the media management data is based on a program operation status of the memory device.

8. The method of claim 1, wherein at least a portion of the media management data is based on a difference of a first temperature of a memory cell of the memory device when data is written to the memory cell and a second temperature of the memory cell when the data read from the memory device.

9. The method of claim 1, further comprising:
responsive to determining that performing the subset of the plurality of operations of the default EH flow did not resolve an error of the memory device, performing all the plurality of operations of the default EH flow.

10. An apparatus, comprising:
a memory device; and
a processor coupled to the memory device and configured to:
retrieve memory management data corresponding to the memory device, wherein the memory management data is associated with a plurality of different error mechanisms, and wherein the memory management data includes data obtained via a read disturb scan that involves tracking an amount of reads for a block of memory cells; and
perform a subset of operations of a default error handling (EH) flow based on the retrieved memory management data,
wherein the default EH flow comprises a plurality of operations configured to resolve multiple types of errors of the memory device, and
wherein the subset of operations of the default EH flow performed by the processor is based on EH flags each corresponding to a respective one of the subset of operations, wherein the EH flags include:
a first EH flag having its status determined based on a program operation status failure; and
a second EH flag having its status determined based on a media scan separate from the read disturb scan.

11. The apparatus of claim 10, wherein the EH flags include a third EH flag having its status determined based on the media scan separate from the read disturb scan, and wherein the media scan separate from the read disturb scan involves cross-temperature data.

12. The apparatus of claim 11, wherein the processor is further configured to, responsive to powering down of a memory sub-system including the memory device, communicate the memory management data from the local memory to the memory device.

13. The apparatus of claim 12, wherein the processor is further configured to, responsive to powering up of the memory sub-system, communicate the memory management data from the memory device to the local memory.

14. The apparatus of claim 10, further comprising a local memory coupled to the processor, and
wherein the processor is further configured to retrieve the memory management data from the local memory in response to initiation of the default EH flow.

15. The apparatus of claim 10, wherein memory management data retrieved includes a raw bit error rate (RBER).

16. The apparatus of claim 10, wherein the processor is further configured to perform only the respective operations of the default EH flow associated with the EH flags which are set.

17. The apparatus of claim 10, wherein:
the default EH flow includes a redundant array of independent NAND (RAIN) recovery operation, and
the processor is further configured to perform the RAIN recovery operation only in response to an associated EH flag being set or all the operations of the default EH flow are performed.

18. A non-transitory computer-readable medium storing instructions executable by a processing device to:
store memory management data generated by a plurality of memory management operations of a memory device, wherein the memory management data corresponds to at least two different error mechanisms experienced by the memory device and wherein the memory management data includes data obtained via a read disturb scan that involves tracking an amount of reads for a block of memory cells;
set, based at least in part on the memory management data corresponding to the at least two different error mechanisms, a plurality of error handling (EH) flags corresponding to respective different operations of an EH flow that are configured to resolve a number of errors associated with the at least two different error mechanisms; and
perform, based on the plurality of EH flags, the different operations of the EH flow; wherein the respective EH flags include:
a first EH flag having its status determined based on the read disturb scan; and
a second EH flag having its status determined based on a program status failure.

19. The computer-readable medium of claim 18, further storing instructions executable to:
subsequent to performance of the respective operations of the EH flow, determine that the number of errors associated with the at least two different error mechanisms are not resolved; and
responsive to determining that the number of errors associated with the at least two different error mechanisms are not resolved, perform all operations of the EH flow.

20. The computer-readable medium of claim 18, wherein:
the plurality of memory management operations include a periodic scan of the memory device that yields a raw bit error rate (RBER) of a block of data stored by the memory device and a cross-temperature of the block of data, and
the medium further stores instructions executable to:
determine whether the RBER is greater than a first threshold value;
responsive to determining that the RBER is greater than the first threshold value, fold the block of data;
responsive to determining that the RBER is not greater than the first threshold value, determine whether the RBER is greater than a second threshold value;
responsive to determining that the RBER is greater than the second threshold value, determine whether the cross-temperature is greater than a third threshold value;
responsive to determining that the cross-temperature is greater than the third threshold value, set a first one of the number of EH flags associated with a data retention operation of the EH flow; and
responsive to determining that the cross-temperature is not greater than the third threshold value, set a second one of the number of EH flags associated with a cross-temperature operation of the EH flow.

21. The computer-readable medium of claim 18, wherein:
the plurality of memory management operations include a workload-dependent scan of the memory device that yields a raw bit error rate (RBER) of a block of data stored by the memory device, and
the medium further stores instructions executable to:
determine whether the RBER is greater than a first threshold value;
responsive to determining that the RBER is greater than the first threshold value, fold a block of data stored by the memory device;
responsive to determining that the RBER is not greater than the first threshold value, determine whether the RBER is greater than a second threshold value;
responsive to determining that the RBER is not greater than the second threshold value, set a particular one of the number of EH flags associated with a read disturb operation of the EH flow.

22. The computer-readable medium of claim 18, wherein:
the plurality of memory management operations include a program operation status of the memory device, and
the medium further stores instructions executable to, responsive to the program operation status indicating a failure:
set a particular one of the number of flags associated with a program failure operation of the EH flow; and
fold the block of data.

* * * * *